Jan. 17, 1967
W. LE BROCQ
3,298,568
BREAD DISPENSER
Filed Oct. 11, 1965
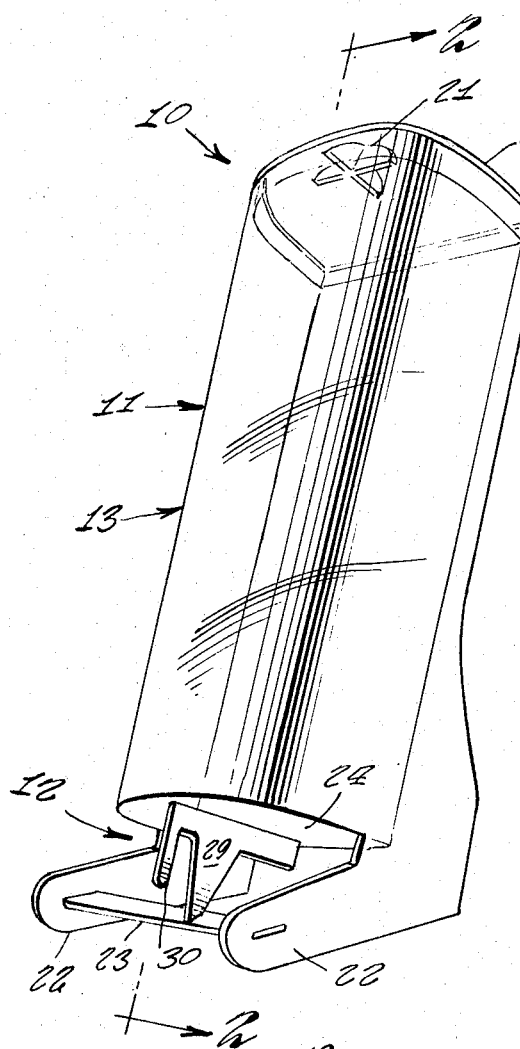
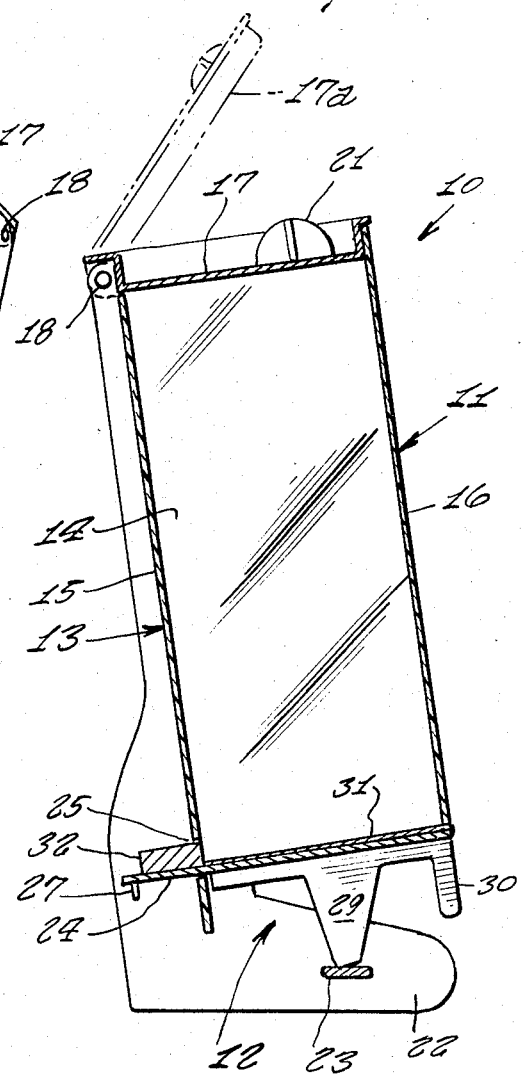
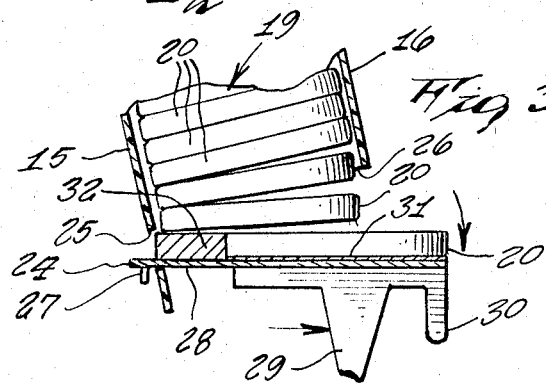
INVENTOR.
WALTER LE BROCQ : 3,298,568
BREAD DISPENSER
Walter Le Brocq, 330 W. Porter Ave.,
Fullerton, Calif. 92632
Filed Oct. 11, 1965, Ser. No. 494,769
1 Claim. (Cl. 221—155)

This invention relates generally to dispensing devices. More specifically it relates to bread slice dispensers.

A principal object of the present invention is to provide a novel bread dispenser for the purpose of storing conventional shaped bread in a sanitary condition free from dust or other contamination and which has self contained means to dispense one slice at a time therefrom as needed without the necessity of touching any of the bread by hand.

Another object is to provide a bread dispenser having self contained means for maintaining the bread in a fresher condition for a longer period of time.

Still another object is to provide a bread dispenser having means of visibility therethrough so that a person can at all times know the quantity of bread remaining within the dispenser and thus be informed when it is necessary to resupply the dispenser with a new loaf of bread.

Another object is to provide a dispenser having a container and dispensing mechanism which is readily adaptable for being designed to dispense other types of articles such as packaged handkerchiefs, small phonograph records and hundreds of other various articles.

Yet another object is to provide a bread dispenser that would be equally adaptable for use in a restaurant as well as in a home kitchen.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

In the drawing:

FIGURE 1 is a front perspective view of the bread dispenser shown with the tray in locked closed position.

FIGURE 2 is a cross-sectional view taken on line 2—2 of FIGURE 1.

FIGURE 3 is a fragmentary cross-sectional view similar to FIGURE 2 showing the tray in an open position with a slice of bread being disposed thereupon.

Referring now to the drawing in detail the numeral 10 represents a bread dispenser according to the present invention wherein there is a container 11 of transparent plastic material and a dispensing mechanism 12.

The container includes a longitudinal housing 13 enclosing a central compartment 14, and including a generally flat rear wall 15 and semi-cylindrical front wall 16. A top cover 17 is pivotally secured thereto by means of rivets 18 and is movable as indicated by phantom lines 17a into an open position to permit loading of the dispenser by a loaf of bread 19 comprised of bread slices 20. A knob 21 on the cover provides convenient grasp means.

The housing 13 includes a pair of feet 22 in spaced apart parallel relation between which there is a brace 23. The housing is supported in an inclined position upon the feet.

The dispensing mechanism 12 includes a slide 24 which forms a slidable bottom wall for the central compartment 14, the slide being movable through an opening 25 in the rear wall of the housing and adjacent the lower edge 26 of the front wall 16. Near the rear end of the slide there is a downwardly depending lug 27 on the underside 28 thereof which abuts against the rear side of the rear wall to limit the forward travel of the slide during bread dispensing operation. On the underside of the slide there is a downward depending post 29 which bears against the brace 23 for supporting the slide in an upward position when the compartment is closed. A downward depending handle 30 formed adjacent to the post provides grasp means for moving the slide manually. A tray 31 is secured on the slide upon which the bread slices 20 can rest and a pusher 32 formed from a block of material mounted on the rear portion of the upper side of the tray provides means for pushing a lowermost bread slice out of the dispenser.

In operative use, to load the dispenser with a loaf of sliced bread, a person must first remove the paper seal at one end of the bread paper wrapper. He must then hold the loaf upright and place the dispenser in inverted position and cover open over the loaf of bread. The dispenser thus loaded is then inverted to right side up. The paper wrapper is then pulled off. Thus the bread is loaded in the dispenser without touching it by hand. The dispenser is now ready for operation. To extract a slice of bread simply pull on handle 30 causing the slide to move forwardly thus causing the post to drop off the brace 23 and allowing the tray to pivot downward as shown in FIGURE 3. Further pull of the handle will cause the pusher 32 to push the lowermost slice of bread forwardly until it may be conveniently grasped by a person's fingers. The slide is now arrested against further forward travel by the lug 27. The slice thus obtained, the slide and its tray are pushed again back to the original position, thus closing the container until another bread slice is again desired.

What I now claim is:

In a bread dispenser, a combination of a container and a dispensing mechanism, said container having refilling means at its upper end and said dispensing mechanism dispensing bread from the lower end of said container, said container comprising a transparent housing having a flat rear wall and a semi-circular front wall to receive a loaf of sliced bread there within, said dispensing mechanism comprising a slide and a tray secured on said slide closing the lower end of said housing, said slide extending through an opening in said rear wall, and a depending lug on said slide to abut said rear wall when said slide is moved to its extreme forward limit to prevent disengagement of said slide and housing, said container including a pair of legs on each side and beneath said housing, a brace extending transversely between said legs, said slide including a downward extending post and handle, said post being in abutment upon said brace to maintain said tray in an upward position to close the lower end of said housing when said container is in closed position, said handle providing means to pull said slide forwardly to dislodge said post from said brace and pivot said tray downwardly about said opening in said rear wall, said slide having a pusher mounted thereupon for pushing forwardly a lowermost slice of bread, said brace being relatively higher above a supporting surface on which said legs may be supported, and said brace being relatively narrow in width whereby said post may be immediately lowered upon a slight forward movement of said tray and lowered a greater distance downwardly than the distance moved forwardly by said tray.

(References on following page)

References Cited by the Examiner

UNITED STATES PATENTS

| | | | |
|---|---|---|---|
| 1,677,938 | 7/1928 | Van Sickle | 222—268 |
| 2,902,187 | 9/1959 | Cabanban | 222—276 |
| 3,161,320 | 12/1964 | Swanson | 221—255 |

FOREIGN PATENTS 354,906  7/1961  Switzerland.

ROBERT B. REEVES, *Primary Examiner.*
WALTER SOBIN, *Examiner.*